United States Patent
He

(10) Patent No.: US 7,559,473 B2
(45) Date of Patent: Jul. 14, 2009

(54) SENSOR FOR ACTIVATING AN AIMING PATTERN OF A HANDHELD SCANNER

(75) Inventor: Duanfeng Jackson He, S. Setauket, NY (US)

(73) Assignee: Symbol Technologies Inc., Holtsville, NY (US)

( * ) Notice: Subject to any disclaimer, the term of this patent is extended or adjusted under 35 U.S.C. 154(b) by 63 days.

(21) Appl. No.: 11/227,649

(22) Filed: Sep. 15, 2005

(65) Prior Publication Data

US 2007/0057067 A1    Mar. 15, 2007

(51) Int. Cl.
   *G06K 7/10*   (2006.01)
   *G06K 9/24*   (2006.01)
(52) U.S. Cl. .............................. 235/462.2; 235/462.48
(58) Field of Classification Search ............ 235/462.17, 235/462.2, 462.21, 462.25, 462.3, 462.42, 235/462.43, 462.48
See application file for complete search history.

(56) References Cited

U.S. PATENT DOCUMENTS

| | | | | |
|---|---|---|---|---|
| 5,610,386 A | * | 3/1997 | Ball et al. | 235/462.44 |
| 5,786,586 A | * | 7/1998 | Pidhirny et al. | 235/472.01 |
| 6,290,134 B1 | * | 9/2001 | Rando et al. | 235/472.01 |
| 6,478,226 B2 | * | 11/2002 | Canini et al. | 235/462.48 |
| 6,648,228 B2 | * | 11/2003 | Dvorkis | 235/462.43 |
| 6,942,153 B1 | * | 9/2005 | Yuan et al. | 235/472.01 |
| 7,055,747 B2 | * | 6/2006 | Havens et al. | 235/462.22 |
| 2002/0056755 A1 | * | 5/2002 | Canini et al. | 235/462.48 |

* cited by examiner

*Primary Examiner*—Kumiko C Koyama

(57) ABSTRACT

A portable indicium scanner that includes circuitry for enabling an aiming pattern through an activation device. The aiming pattern targets selected indicia and signals the operator indicating whether a proper selection has been made, thereby allowing an imaging system to capture and decode the targeted indicia. The activation device includes a switch, two-stage trigger, an accelerometer, or photosensor that is located within the scanner.

3 Claims, 3 Drawing Sheets

SENSOR FOR ACTIVATING AN AIMING PATTERN OF A HANDHELD SCANNER

FIELD OF THE INVENTION

The present disclosure relates to a portable or handheld bar code scanner and, more particularly, to a handheld scanner including sensors for activating an aiming pattern of the scanner.

BACKGROUND ART

Various electro-optical systems have been developed for reading optical indicia, such as barcodes. A barcode is a coded pattern of graphical indicia comprised of a series of bars and spaces of varying widths, the bars and spaces having differing light reflecting characteristics. Some of the more popular barcode symbologies include: Uniform Product Code (UPC), typically used in retail stores sales; Code 39, primarily used in inventory tracking; and Postnet, which is used for encoding zip codes for U.S. Mail. Systems that read and decode barcodes employing CCD or CMOS-based imaging systems are typically referred to as imaging-based barcode readers or barcode scanners.

Imaging systems include CCD arrays, CMOS arrays, or other imaging pixel arrays having a plurality of photosensitive elements or pixels. Light reflected from a target image, e.g., a target barcode is focused through a lens of the imaging system onto the pixel array. An analog-to-digital converter digitizes output signals from the pixels of the pixel array. Decoding circuitry of the imaging system processes the digitized signals and attempts to decode the imaged barcode.

It is desirable for a portable barcode scanner to have a streamline shape for ease in operation. As such, a portable or hand held barcode scanners lack physical aiming devices or sites. Instead, an aiming pattern is projected onto the desired barcode during the scanning process. This typically involves an operator engaging a trigger located on the scanner, which enables the aiming pattern to be projected while simultaneously initiating the decoding process of the image or barcode to be scanned.

The aiming pattern may be turned off when an imaging system of the scanner captures the images required for decoding, and the aiming pattern is completely inactive or disabled when the scanner successfully decodes an image. The relatively short time to turn off the aiming pattern (usually approximately 10 ms) to capture the images produces a misconception that the aiming pattern is active for the entire duration of the decode session.

The lack of a physical aiming device, and the inability of the projected aiming pattern being activated ahead of the pull-trigger create several problems during operation of portable barcode scanners. For example, if the aiming pattern was found to be aimed at the wrong barcode, it becomes too late for initiating a corrective measure, especially in scanners where the images are taken at substantially the same time as activation of the aiming pattern. This problem is exacerbated by the fact that barcodes are commonly arranged in a "picklist" configuration, where a sheet is populated with several barcodes arranged in an array.

One attempt to alleviate the described problem has been designing a scanner with an imager capable of detecting motion. This type of system relies on the principle that the user is attempting to scan items with the portable scanner when motion was detected between images, thus activating the aiming pattern without engagement of the scanner trigger. Once the operator verifies that the scanner was targeted at the proper barcode, the trigger was then activated to scan the barcode. Several problems however, resulted from the aforementioned approach. One problem with this approach is the detection of motion that was not in the sense real or intended to initiate the scanning process, and thereby, falsely enabled the aiming pattern. This false motion problem frequently occurred when the portable scanner was positioned in a stand while not in use continued to detect objects that passed in front of the imaging system. In addition, improper scans frequently occurred whenever there was a change in lighting, since the imagining system would falsely sense that motion was occurring.

Another type of error may arise when an operator fails to move the scanner within the allotted time, thus causing a false decode to be registered. Although the wait time for confirming a correctly aimed barcode can be customized for each operator, such that it is not too fast for the operator to move in time when needed, nor too slow when no motion was needed after a trigger-pull, such customization is often not practical. For example, in many point of sale situations more than one operator gets to use a scanner during the course of a business day.

What is needed is a high-speed and efficient manner of scanning varying indicia with a handheld scanning device, wherein the operator can control the enablement of the aiming pattern in order to verify that the scanner is aiming at the proper barcode before initiating the decoding process.

SUMMARY

The present disclosure is directed to a portable barcode scanner. The barcode scanner includes an aiming pattern apparatus and an imaging system. The aiming pattern is projected on a target object, such as a barcode. The imaging system includes a focusing lens to focus an image of the target object. The portable barcode scanner includes a housing having a portion, such as a handle, for holding and for orientating the portable scanner. The imaging system captures images within a field of view of the imaging system and decodes coded indicia, such as a barcode found within the captured image, including an image system and an aiming pattern apparatus, which upon actuation produces an aiming pattern. The portable scanner includes internal circuitry capable of decoding said indicia into decipherable code that is transmitted to an output of the imaging system. An activation device is integrated into the imaging system's circuitry enabling the aiming pattern independently from the decoding operation of the indicia.

In one aspect, the barcode scanner's activation device is a two-position trigger switch, where the aiming pattern is enabled when the switch is displaced to a first position and the decoding of the indicia occurs once the two-position switch is displaced to a second position.

Another feature of the barcode scanner is an activation device that includes a switch that enables the aiming pattern based on the detection of the presence of an operator. This is achieved by the addition of a pressure switch that detects the operator gripping the handle of the scanner, or a photosensor located in the handle that commences the aiming pattern once the sensor is covered by the operator's hand. In an alternative embodiment, a touch switch located in the handle activates the aiming device based on the detection of the operator through the recognition of the change in conductance or capacitance caused by the operator's hand-holding action.

Another aspect of the scanner is an activation device that enables the aiming pattern through a second switch, such as a toggle switch. In a separate embodiment, the aiming pattern is initiated from the movement of the scanner. Such movement is detected by the internal circuitry of the scanner that includes for example, an accelerometer.

Yet another aspect of the present disclosure deals with imaging scanners embedded in handheld computers. Aside from necessary adaptations to fit the form factors of handheld computers, all discussions in the context of a handheld imaging-based barcode scanner can equally apply to a handheld computer.

These and other objects, advantages, and features of the exemplary embodiment of the invention are described in detail in conjunction with the accompanying drawings.

DETAILED DESCRIPTION

An imaging-based barcode scanner system is shown schematically at 10 in FIGS. 1 through 6. A typical profile of a portable barcode scanner 30 is physically shown in FIGS. 1-5. In addition to imaging and decoding 1D and 2D barcodes, including postal codes, and Code 39 barcodes, the barcode scanner system 10 is also capable of capturing images and signatures. In one preferred embodiment of the present invention, the barcode scanner 30 is a hand held portable scanner that can be carried and used by a user walking or riding through a store, warehouse or plant, while scanning barcodes for stocking and inventory control purposes.

However, it should be recognized that the imaging-based barcode scanner 30 of the present invention, to be explained below, may be advantageously used in connection with any type of imaging-based automatic identification system including, but not limited to, barcode readers, signature imaging acquisition and identification systems, optical character recognition systems, fingerprint identification systems and the like. It is the intent of the present invention to encompass all such imaging-based automatic identification systems.

Figure 1:
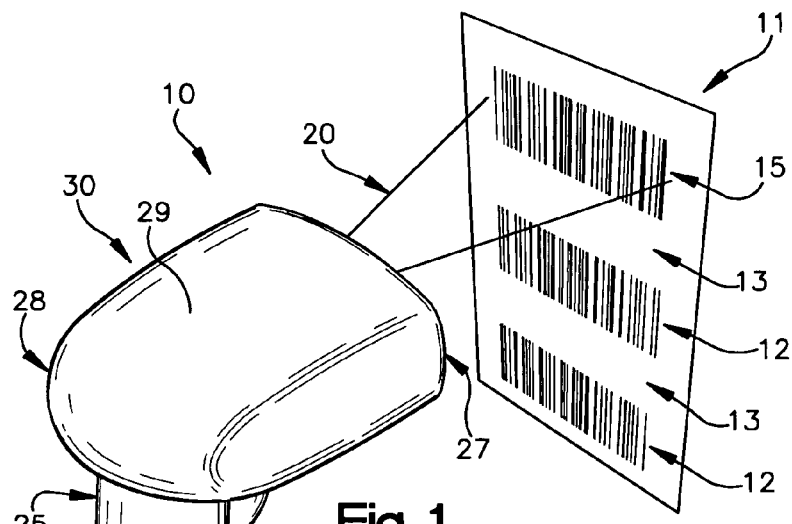
FIG. 1 is a perspective view of an imaging-based barcode scanner scanning a series of barcodes from a "pick list"
Figure 2:
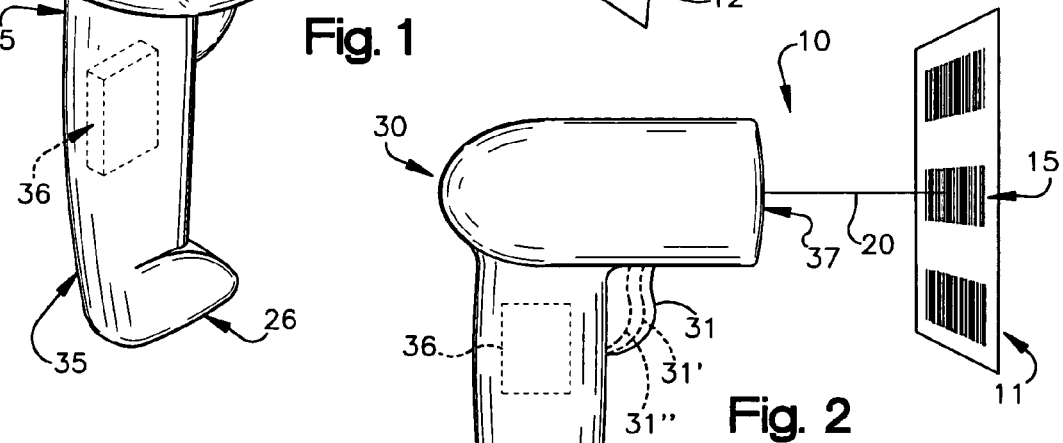
FIG. 2 is a side view of an image-based barcode scanner with a two-position trigger switch.
Figure 3:
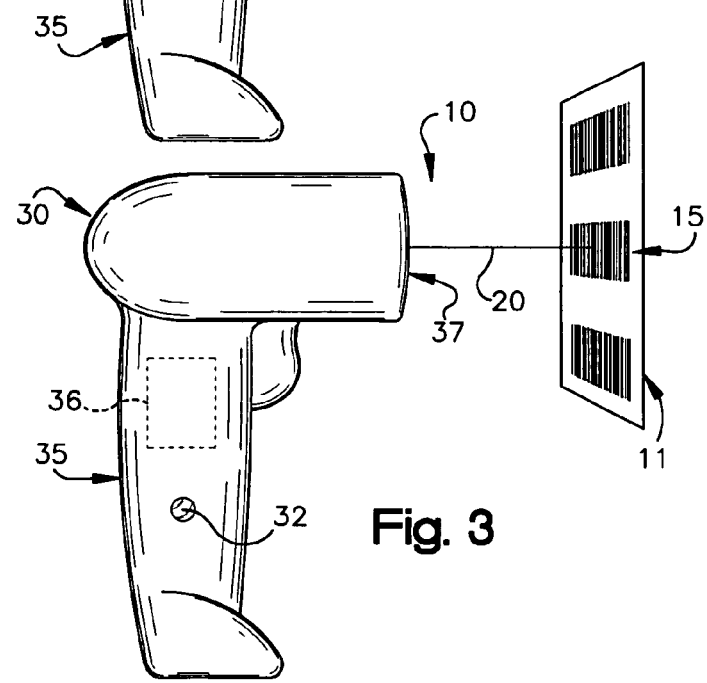
FIG. 3 is a side view of an imaging-based barcode scanner having a photosensor located within the handle.

Turning now to the figures and more specifically, FIGS. 1 and 2, which show the barcode scanner 30 to include both a handle 35 that is located between an upper end 25 and lower end 26. The scanner further includes a scanning portion or head 29 situated between a first and second ends 27 and 28, respectively.

Figure 4:
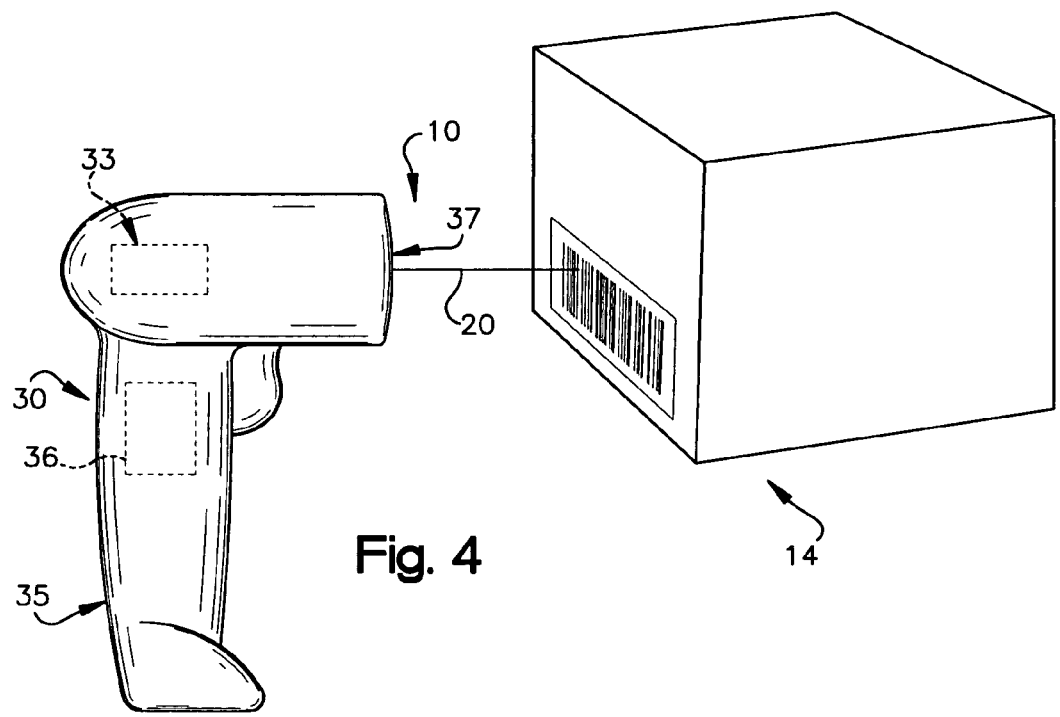
FIG. 4 is a side view of an imaging-based barcode scanner with a motion sensor within the body where the scanner is imaging indicia located on a package.

Typically located about the upper end 25 of the handle 35 is a trigger 31, when engaged by the operator initiates the reading of a target barcode 15. The trigger 31 is coupled to the barcode scanner circuitry 36 for initiating reading of a target barcode 15 positioned on an object 14, as shown in FIG. 4, or located on a pick list 11 that comprises an array of barcodes 12 with spaces or voids 13 therebetween.

Figure 6:
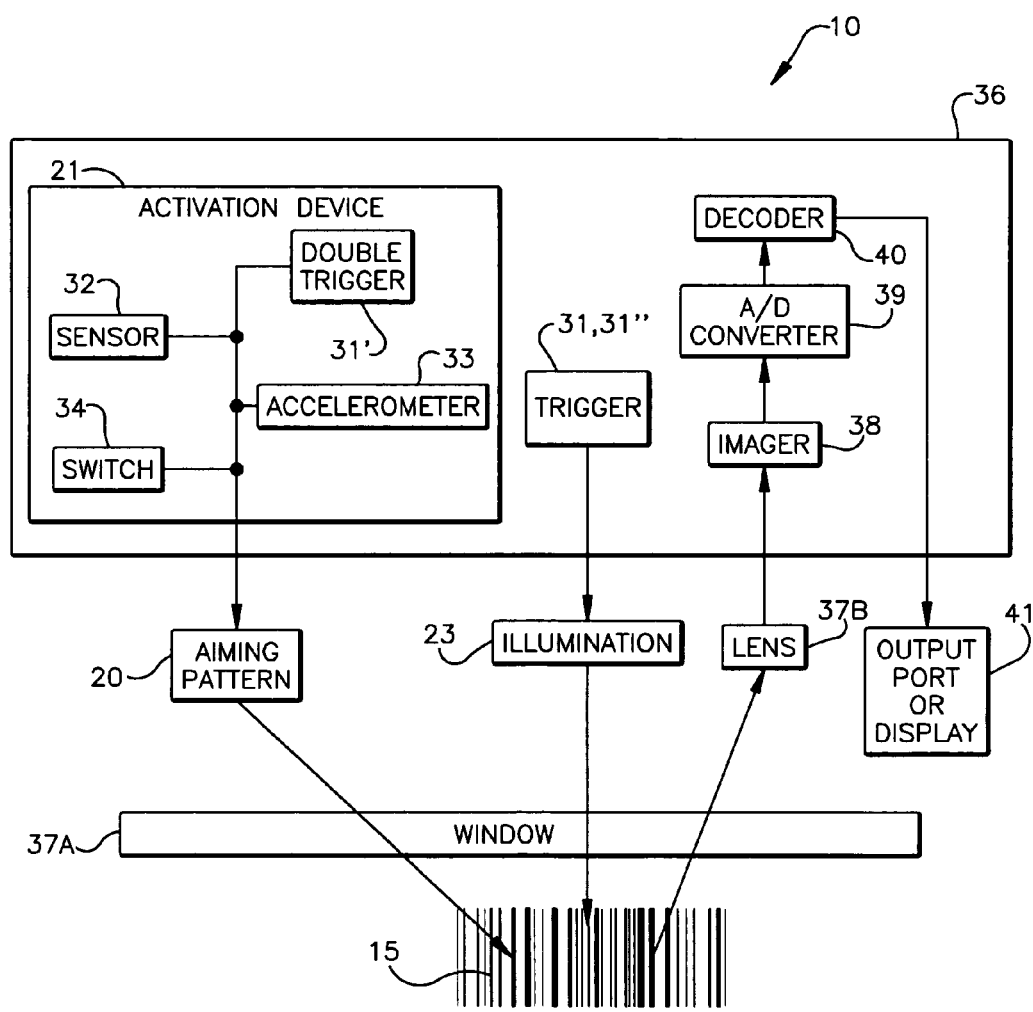
FIG. 6 is a schematic block diagram of an imaging-based barcode scanner having an activation device for enabling an aiming pattern.

The scanning process as performed by an operator using the imaging-based barcode scanner system 10 is depicted in FIG. 6. An activation device 21, which is either triggered automatically or manually by the operator, as shall be discussed in detail, activates an aiming pattern 20, which is projected from the scanner 30 through a window 37A. The operator aligns the aiming pattern with the target barcode 15, then engages the trigger 31 to initiate the decoding sequence of the target barcode 15.

The activation device 21 can be any number of apparatus in communication with the scanner circuitry 36. In one embodiment, the activation device is a sensor 32, for example, a photosensor or touch sensor that is embedded in the handle 35 of scanner 30. An operator's grasping of the handle forces the photosensor 32 in FIG. 3 to become covered, thereby changing the light pattern and enabling the aiming pattern 20. In another embodiment, the sensor 32 is a touch sensor that enables the aiming pattern 20 as a result of the conductance or capacitance of the operator's hand on the handle 35. The sensor 32 could also be a pressure sensor that activates they aiming pattern based on pressure induced by the operator as he or she naturally grips the portable scanner.

In yet another embodiment, movement of the scanner 30 engages the aiming pattern 20. One method of detecting such movement is by implanting an accelerometer 33 (shown in FIGS. 4 and 6) within the housing of the scanner 30. Once the operator raises the scanner 30 for operation, the accelerometer sends an output signal to the internal circuitry 36 of the scanner that enables the aiming pattern 20.

Figure 5:
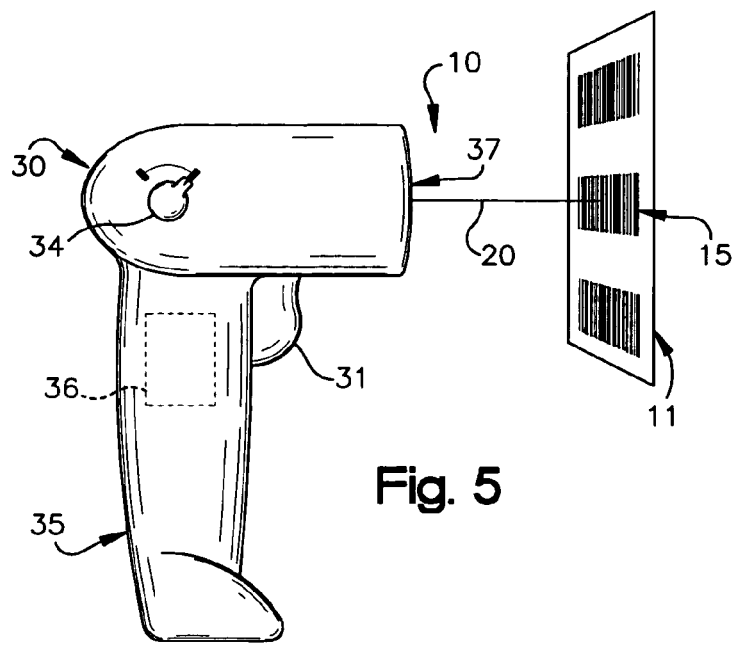
FIG. 5 is a side view of the imaging-based barcode scanner having a second switch.

In a further embodiment, the activation device is a toggle switch 34, as depicted in FIG. 5. The operator manually positions the switch to an on position, thereby activating the aiming pattern 20.

In another embodiment the activation device is a two-position trigger switch 31 as shown in FIG. 2. When the trigger 31 is pulled or pressed to a first position 31', the aiming pattern 20 becomes activated. The operator is then able to direct the aiming pattern on the desired or target barcode 15. Once the operator confirms the aiming pattern is projected on the proper barcode, the trigger 31 is pulled or pressed to a second position 31" as shown in FIG. 2, thus initiating the decoding sequence.

Returning now to FIG. 6, the activation device 21 is first enabled, which causes the aiming pattern to be projected through a window 37 onto the target barcode 15. The operator confirms that the aiming pattern 20 is on the target barcode 15, optionally redirects the scanner before doing so, and then he or she engages the trigger 31, thereby activating the decoding sequence.

Once the decoding sequence has been initiated, at a predetermined interval, an image acquisition process is started, during which the aiming pattern is turned off and an illumination 23 is projected through the window 37A at the target barcode, of which an image is reflected back through the window 37A at a lens 37B onto an array of photosensors or pixels located within the CCD or CMOS imager 38. The pixels of the pixel array are read, generating an analog signal that is sent from the imager 38 to an analog to digital converter 39. The A/D converter 39 then sends a digital signal to a decoder 40 where it becomes synthesized by the decoder's internal circuitry. The aiming pattern is turned on again after the acquisition of the image. It is often necessary to acquire a few images before a successful decode is achieved. The aiming pattern is left on until the operator is ready to take another image or a successful decode has been completed of the targeted information. The microprocessor in the scanner processes the image and attempts to decode it into a data stream. If the decode is successful, the decode session is terminated with the decoded information being sent to an output port and/or display 41 for the operator's attention. If the decode is unsuccessful, the decode session continues with a repeated image acquisition.

While the present invention has been described with a degree of particularity, it is the intent that the invention includes all modifications and alterations from the disclosed design falling with the spirit or scope of the appended claims.

I claim:

1. A scanning apparatus comprising:
   a handheld indicium scanner including:
   an accelerometer acting as a first switch for enabling an aiming pattern projected from said scanner once movement is detected;
   a portion of a housing for holding and for orientating said scanner;
   a second switch constructed as a trigger pivotally connected to the housing of said scanner for initiating an imaging process and decoding process by projecting an image beam from an illumination source toward a target object;
   circuitry for imaging indicia captured with an aid of an aiming pattern and for imaging and decoding said indicia of said image beam;
   a lens through which said image beam is received by said scanner; and
   said accelerometer acting as said first switch independently operable from said second switch that upon detecting movement of said handheld indicium scanner enables said aiming pattern that is projected from the handheld indicium scanner at the indicia, the aiming pattern being independent from said imaging decoding, where said accelerometer is located within said indicium scanner but is at least partially separate from a central processing unit and an image sensor of the scanner;
   whereby said first switch for operating said aiming pattern comprising said accelerometer must be first enabled, thereby allowing said second switch for operating said imaging beam to be enabled once said trigger is engaged such that a concurrent enabled condition in the accelerometer for projecting said aiming pattern with the enablement of said second switch in the projection of said image beam initiates said imaging and decoding processes, such that the aiming pattern remains enabled until achieving a predetermined condition.

2. The scanning apparatus of claim 1, wherein the predetermined condition is after a successful decoding is achieved.

3. The scanning apparatus of claim 1, wherein the predetermined condition is upon initiating of the imaging process.

* * * * *